United States Patent
Corey

(10) Patent No.: US 8,827,604 B1
(45) Date of Patent: Sep. 9, 2014

(54) HOLE SAW APPARATUS

(76) Inventor: Tim Corey, Mt. Vernon, WA (US)

( * ) Notice: Subject to any disclaimer, the term of this patent is extended or adjusted under 35 U.S.C. 154(b) by 736 days.

(21) Appl. No.: 12/852,623

(22) Filed: Aug. 9, 2010

(51) Int. Cl.
*B23B 41/02* (2006.01)

(52) U.S. Cl.
USPC .................. 408/204; 408/209; 408/239 R

(58) Field of Classification Search
USPC .............................. 408/204, 206, 209, 239 R
See application file for complete search history.

(56) References Cited

U.S. PATENT DOCUMENTS

| | | | | |
|---|---|---|---|---|
| 3,778,179 A * | 12/1973 | Rivas | | 408/206 |
| 3,973,862 A * | 8/1976 | Segal | | 408/204 |
| 4,033,703 A | 7/1977 | Slater | | |
| 4,098,342 A | 7/1978 | Robinson et al. | | |
| 4,148,593 A * | 4/1979 | Clark | | 408/204 |
| 4,551,045 A * | 11/1985 | Bossler | | 408/206 |
| 4,968,189 A * | 11/1990 | Pidgeon | | 408/1 R |
| 5,061,126 A | 10/1991 | Cain et al. | | |
| 5,082,403 A * | 1/1992 | Sutton et al. | | 408/68 |
| 5,690,452 A * | 11/1997 | Baublits | | 408/204 |
| 7,101,124 B2 * | 9/2006 | Keightley | | 408/204 |
| 7,850,405 B2 * | 12/2010 | Keightley | | 408/204 |
| 8,038,371 B2 * | 10/2011 | Miller et al. | | 408/204 |
| 8,038,372 B2 * | 10/2011 | Miller et al. | | 408/204 |
| 8,113,748 B2 * | 2/2012 | Werner | | 408/68 |
| 2002/0037201 A1 * | 3/2002 | Despres | | 408/204 |
| 2005/0042048 A1 * | 2/2005 | Keightley | | 408/204 |
| 2007/0036620 A1 | 2/2007 | Keightley | | |
| 2010/0086372 A1 * | 4/2010 | Werner | | 408/1 R |

* cited by examiner

*Primary Examiner* — Essama Omgba
(74) *Attorney, Agent, or Firm* — Crossley Patent Law; Micah C. Gunn

(57) ABSTRACT

The hole saw apparatus cuts a hole in an existing work object such as drywall, for example. Floor and ceiling cuts as well as other hole cuts are also provided for. The apparatus enables a hole to be cut in the existing work object while guarding against electrical wire damage. The shank may be hexagonal and is chucked into an existing drill. Any existing wire is pulled through the guarded cylinder and even inserted into the sleeve if needed. The apparatus is then free to rotate around the wire and cut the desired hole. Upon completion of hole cutting, the apparatus is pulled away from the work object without damaging the wire. After cutting, a plug usually stays within a hole saw. The sliding mechanism of the apparatus provides for easily removing the cut plug from the hole saw.

2 Claims, 2 Drawing Sheets

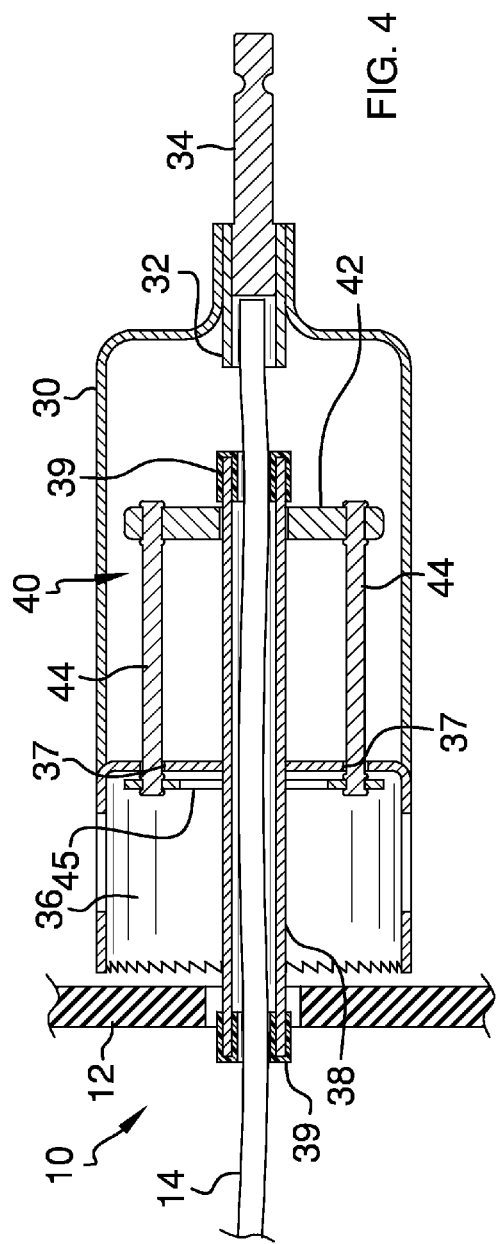
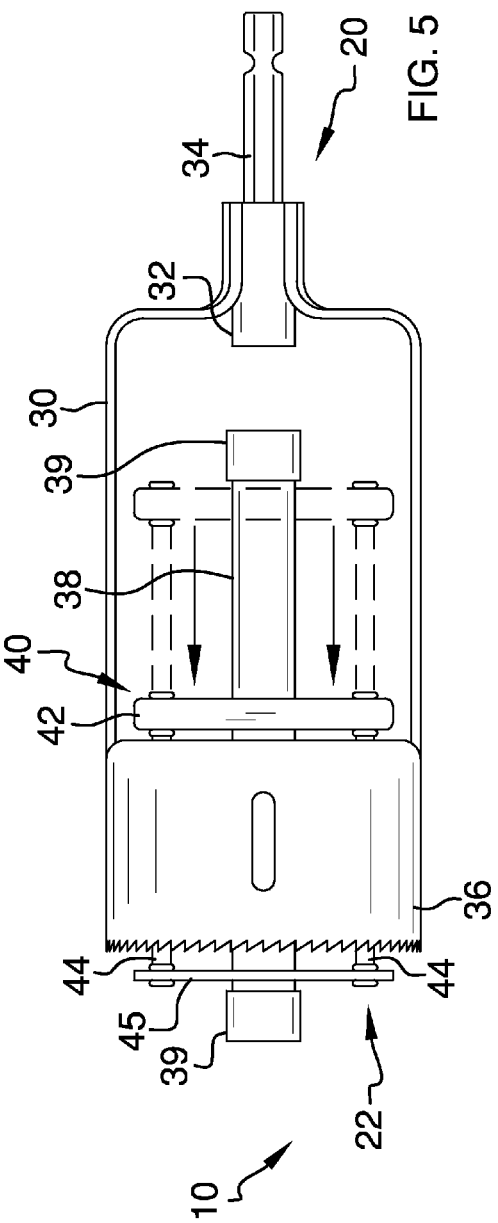

HOLE SAW APPARATUS

BACKGROUND OF THE INVENTION

Oftentimes a hole must be cut into a given work object such as a wall, for example, where electrical wiring is present. Typically, several problems exist. First, striking wires with a hole saw results in wire damage and destruction. Further, electrical shorts and additional electrical damage may result. With either problem, repairs are required. When wires are stubbed out from a wall, the wires must typically be pushed back into the wall, the hole drilled, then the wires pulled back through. Constant care must be practiced not to contact the wires. The present apparatus provides for hole drilling where wires exist.

FIELD OF THE INVENTION

The hole saw apparatus relates to hole saws and more especially to an apparatus that provides for drilling holes where wire exists, and for drill hole plug removal from the apparatus.

SUMMARY OF THE INVENTION

The general purpose of the hole saw apparatus, described subsequently in greater detail, is to provide a hole saw apparatus which has many novel features that result in an improved hole saw apparatus which is not anticipated, rendered obvious, suggested, or even implied by prior art, either alone or in combination thereof.

To attain this, the hole saw apparatus cuts a hole in an existing work object such as drywall, for example. Floor and ceiling cuts as well as other hole cuts are also provided for. The apparatus enables a hole to be cut in the existing work object while guarding against electrical wire damage. The shank may be hexagonal and is chucked into an existing drill. Any existing wire is pulled through the guarded cylinder and even inserted into the sleeve if needed. The apparatus is then free to rotate around the wire and cut the desired hole. Upon completion of hole cutting, the apparatus is pulled away from the work object without damaging the wire. After cutting, a plug usually stays within a hole saw. The sliding mechanism of the apparatus provides for easily removing the cut plug from the hole saw.

Thus has been broadly outlined the more important features of the improved hole saw apparatus so that the detailed description thereof that follows may be better understood and in order that the present contribution to the art may be better appreciated.

An object of the hole saw apparatus is to cut a hole in an existing work object.

Another object of the hole saw apparatus is to cut a hole in an existing work object while guarding against electrical wire damage.

A further object of the hole saw apparatus is to easily remove a cut plug from the hole saw.

These together with additional objects, features and advantages of the improved hole saw apparatus will be readily apparent to those of ordinary skill in the art upon reading the following detailed description of presently preferred, but nonetheless illustrative, embodiments of the improved hole saw apparatus when taken in conjunction with the accompanying drawings.

In this respect, before explaining the current embodiments of the improved hole saw apparatus in detail, it is to be understood that the hole saw apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved hole saw apparatus. It is therefore important that the claims be regarded as including such equivalent constructions insofar as they do not depart from the spirit and scope of the hole saw apparatus. It is also to be understood that the phraseology and terminology employed herein are for purposes of description and should not be regarded as limiting.

BRIEF DESCRIPTION OF THE DRAWINGS

FIG. 4 is a cross sectional view of FIG. 3, taken along the line 4-4.
FIG. 5 is a lateral elevation view.

DETAILED DESCRIPTION OF THE DRAWINGS

With reference now to the drawings, and in particular FIGS. 1 through 5 thereof, the principles and concepts of the hole saw apparatus generally designated by the reference number 10 will be described.

Figure 1:
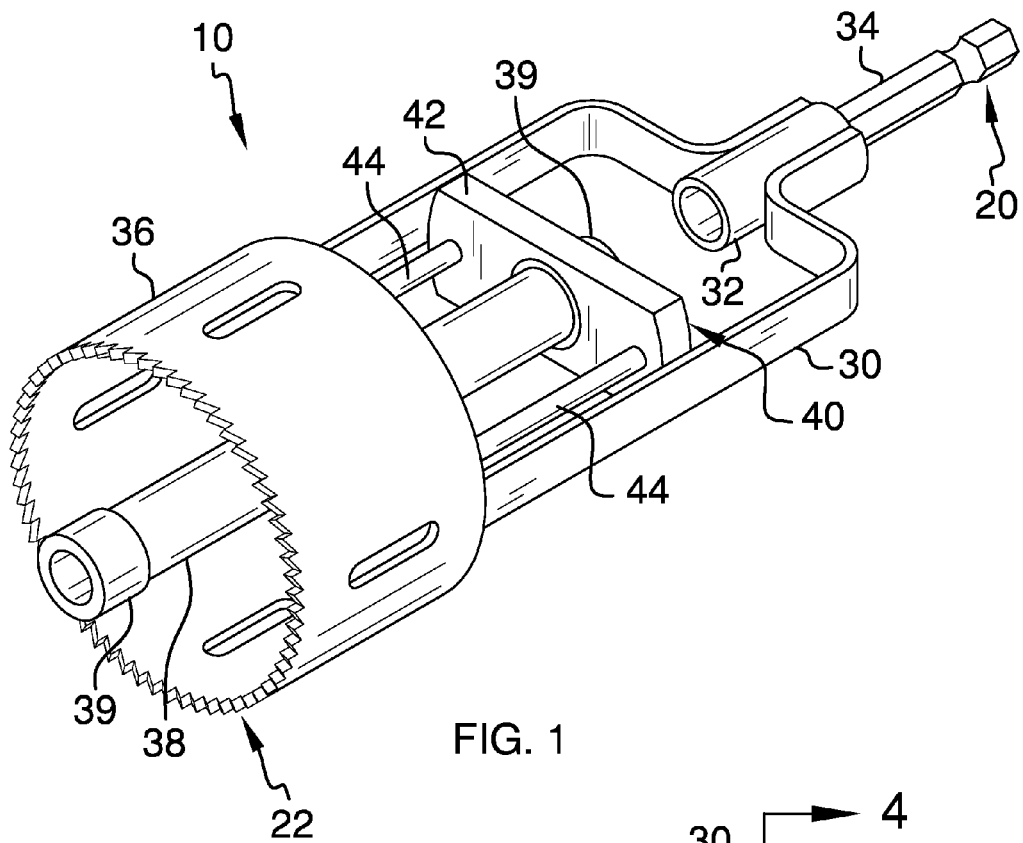
FIG. 1 is a bottom perspective view.

Referring to FIG. 1, the apparatus 10 comprises a top 20 spaced apart from the bottom 22. The apparatus 10 also comprises the U-shaped frame 30.

Continuing to refer to FIG. 1 and referring also to FIG. 4, the sleeve 32 is disposed within the U-shaped frame 30 proximal the top 20. The hexagonal shank 34 is extended from the sleeve 32 to the top 20. The hole saw 36 is attached downwardly to the U-shaped frame 30. The pair of identical spaced apart guide holes 37 is disposed upwardly within the hole saw 36. The cylinder 38 is disposed centrally within hole saw 36. The cylinder 38 is extended above and below the hole saw 36. A guard 39 is disposed at each end of the cylinder 38.

Figure 2:
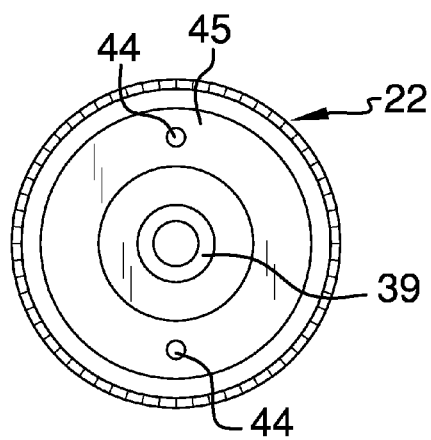
FIG. 2 is a bottom plan view.

Referring to FIG. 2, the bottom 22 of the apparatus 10 clearly reveals the push washer 45 disposed on the guides 44 that guide the up and down movement of the push washer 45 within the hole saw 36.

Figure 3:
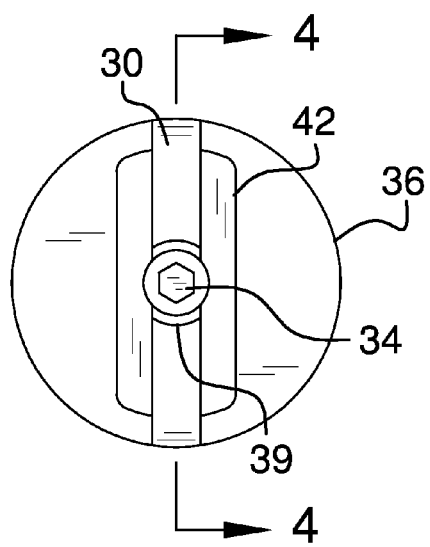
FIG. 3 is a top plan view.

Referring to FIG. 3, the top plan view of the apparatus 10 illustrates the plate 42 disposed above the hole saw 36 and below the sleeve 32 attached atop the U-shaped frame 30. The shank 34 is preferably hexagonal.

Referring to FIG. 5 and also to FIG. 4, the sliding mechanism 40 is movably disposed within the U-shaped frame 30. The sliding mechanism 40 partially comprises the plate 42 extended horizontally within and proximal to the U-shaped frame 30. The pair of identical spaced apart guides 44 is extended downwardly from the plate 42. The guides 44 are slideably disposed within the hole saw 36 guide holes 37. The push washer 45 is disposed horizontally and downwardly on the guides 44. The push washer 45 is slideably disposed within the hole saw 36 and along the cylinder 38.

Referring again to FIGS. 4 and 5, the apparatus 10 addresses the need for a relatively large hole within the work object 12. An existing hole within the work object 12 removably receives the cylinder 38 with guard 39 within. The shank 34 is chucked within an existing drill and the hole saw 36 used to cut a hole in the object 12. The existing wire 14 is freely held within the cylinder 38 and also partly within the sleeve 32. As the wire 14 is freely held, the apparatus 10 is free to turn in order for the hole saw 36 to cut the needed hole. After cutting, the plug (not shown) of the object 12 is disposed within the hole saw 36. The push washer 45 of the sliding mechanism 40 is used to remove a plug from the hole saw 36.

With respect to the above description then, it is to be realized that the optimum dimensional relationships for the parts of the hole saw apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the hole saw apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the hole saw apparatus may be used.

Therefore, the foregoing is considered as illustrative only of the principles of the hole saw apparatus. Further, since numerous modifications and changes will readily occur to those skilled in the art, it is not desired to limit the hole saw apparatus to the exact construction and operation shown and described, and accordingly, all suitable modifications and equivalents may be resorted to, falling within the scope of the hole saw apparatus.

What is claimed is:

1. A hole saw apparatus comprising, in combination:
   a top spaced apart from a bottom;
   a U-shaped frame;
   a sleeve disposed within the U-shaped frame proximal the top;
   a hexagonal shank extended from the sleeve to the top;
   a hole saw attached downwardly to the U-shaped frame;
   a pair of identical spaced apart guide holes disposed upwardly within the hole saw;
   a cylinder disposed centrally within hole saw, the cylinder extended above and below the hole saw;
   a sliding mechanism movably disposed within the U-shaped frame, the sliding mechanism comprising:
      a plate extended horizontally within and proximal to the U-shaped frame;
      a pair of identical spaced apart guides extended downwardly from the plate, the guides slideably disposed within the hole saw guide holes;
      a push washer disposed horizontally and downwardly on the guides, the push washer slideably disposed within the hole saw and along the cylinder.

2. The apparatus according to claim 1 further comprising a guard disposed at an each end of the cylinder.

\* \* \* \* \*